United States Patent [19]

Moss

[11] Patent Number: 5,614,658
[45] Date of Patent: Mar. 25, 1997

[54] EXHAUST SENSOR

[75] Inventor: Dennis W. Moss, Waukesha, Wis.

[73] Assignee: Dresser Industries, Dallas, Tex.

[21] Appl. No.: 268,815

[22] Filed: Jun. 30, 1994

[51] Int. Cl.$^6$ .................................................. G01N 27/26
[52] U.S. Cl. ........................... 73/23.31; 73/31.05; 60/286
[58] Field of Search .................................. 73/23.32, 116, 73/23.31, 31.05; 60/276, 277, 281, 285, 286

[56] References Cited

U.S. PATENT DOCUMENTS

| | | | |
|---|---|---|---|
| 4,004,452 | 1/1977 | Logothetis et al. | 73/23.32 |
| 4,344,317 | 8/1982 | Hattori et al. | 73/23.32 |
| 4,372,155 | 2/1983 | Butler et al. | 73/23.32 |
| 4,505,246 | 3/1985 | Nakajima et al. | 73/23.32 |
| 4,534,213 | 8/1985 | Mirikidani | 73/23.32 |
| 4,534,330 | 8/1985 | Osuga et al. | 73/23.32 |
| 4,561,402 | 12/1985 | Nakano et al. | 73/23.32 |
| 4,611,562 | 9/1986 | Nakano et al. | 73/23.32 |
| 4,617,795 | 10/1986 | Adthoff et al. | |
| 4,638,783 | 1/1987 | Snyder. | |
| 4,796,587 | 1/1989 | Nakajima et al. | 73/23.32 |
| 4,831,820 | 5/1989 | Lassanske. | |
| 4,842,713 | 6/1989 | Stahl. | |
| 4,993,392 | 2/1991 | Tanaka et al. | 73/23.32 |
| 5,219,228 | 6/1993 | Ker et al. | 73/116 |
| 5,231,864 | 8/1993 | Ishida et al. | 73/23.32 |
| 5,243,954 | 9/1993 | Moss. | |
| 5,389,223 | 2/1995 | Hoetzel. | |

FOREIGN PATENT DOCUMENTS

| | | |
|---|---|---|
| 0151795 | 12/1984 | European Pat. Off. |
| 2017927 | 10/1979 | United Kingdom. |
| WO90/01162 | 1/1990 | WIPO. |

OTHER PUBLICATIONS

Beshouri "Predictive NOx Emissions Monitoring for Stationary Engines", Emissions Report, (p. 18 & 20) May 1994.

*Primary Examiner*—Elizabeth L. Dougherty
*Assistant Examiner*—Eric S. McCall
*Attorney, Agent, or Firm*—Andrus, Sceales, Starke & Sawall

[57] ABSTRACT

A diffusion path is provided from the exhaust pipe of an internal combustion engine, and a restriction is provided in the diffusion path which permits diffusion of gaseous exhaust therethrough, and which reduces diffusion of particulate exhaust therethrough, reducing contamination and/or poisoning of a downstream sensor. In a lean-burn industrial engine, the exhaust temperature is lower than the operating temperature of a lean-burn oxygen sensor, and the restricted diffusion path concurrently minimizes cooling of the sensor by gaseous exhaust flow thereagainst. The sensor element is in an antechamber in a housing external of the exhaust pipe, and auxiliary heaters in the housing relieve overdriving of the internal heater of the lean-burn oxygen sensor, extending life to meet long interval industrial requirements.

11 Claims, 2 Drawing Sheets

● STOICHIOMETRIC   □ LEAN-BURN

EXHAUST SENSOR

BACKGROUND AND SUMMARY

The invention relates to the detection of exhaust from an internal combustion engine.

The invention arose during development efforts directed toward reducing downtime of large, stationary industrial internal combustion engines continuously operated over long intervals. Such engines generate up to thousands of horsepower, and are used in large scale electrical and motive power generation applications, for example utility company power generation, mining and pumping applications, ocean going vessels, and so on. These engines are characterized by extremely long service intervals, as compared to automotive applications. For example, some of such engines have service intervals longer than the total operational life of automobile engines.

During the noted long intervals between service on large industrial engines, it is desirable to allow continuous operation, without downtime. Furthermore, the engine should operate within specified tolerances during the entire length of such interval, without drifting from allowable specifications. One of such specifications is that the proper air/fuel ratio be maintained within an allowable tolerance window. Another specification is that exhaust emissions be maintained below a given limit.

The noted large, industrial, long interval engines may be provided with an oxygen sensor, for example U.S. Pat. Nos. 4,638,783 and 5,243,954, incorporated herein by reference. The oxygen sensor detects the relative presence of oxygen in the exhaust of the engine and generates an output voltage signal which is fed back to a controller controlling the fuel delivery system to ensure that the proper air/fuel ratio is being supplied to the engine. Some industrial engines, including some lean-burn engines, may be equipped with a catalytic converter. In such applications, the oxygen sensor additionally ensures that the proper exhaust gas constituents are transmitted to the catalytic converter for oxidation and reduction.

There are several types of oxygen sensors. Oxygen sensors were first developed for automotive applications to be used in conjunction with catalytic converters. The motive was to control the mixture of exhaust constituents into the catalyst so that it could do its job, i.e. so that both the oxidation and reduction reactions go to completion. Most automotive applications are based on stoichiometric engines, i.e. engines that run at the chemically correct air/fuel ratio so that the oxygen content remaining after combustion is near zero. One characteristic of stoichiometric engines is a relatively high exhaust temperature, e.g. about 1200°–1300° F. The oxygen sensor is immersed in this high temperature exhaust gas flow, and the exhaust gas heats the sensor to operating temperature. There is a warm-up period, when the car is first started, during which the oxygen sensor is below the temperature range required to operate correctly. During warm-up, the catalytic converter cannot function properly, and exhaust pollutants emitted to the atmosphere are high.

The noted warm-up period spawned the development of oxygen sensors with internal electrical heaters. Legislation addressing automotive start-up emissions was met with a system based on an electrically heated oxygen sensor. These sensors, like their predecessors, are inserted directly into the exhaust stream and give the same type of output, FIG. 1, with a knee or fall-off from a high output to a low output at about zero exhaust oxygen concentration.

As engine designers began searching for different ways to lower exhaust emissions and improve fuel economy, lean-burn technology began to evolve. This technique involves deliberately having excess air in the combustion chamber when the fuel is burned. Lower emissions and better fuel economy are enabled. However, stoichiometric oxygen sensors do not provide a meaningful signal at lean air/fuel ratios, FIG. 1. Thus, if engines were to be properly controlled, a new type of oxygen sensor had to be developed. This was the impetus for lean-burn oxygen sensors.

Lean-burn oxygen sensors have a different output characteristic than stoichiometric oxygen sensors, FIG. 1, and provide a meaningful signal at lean air/fuel ratios. One type of lean-burn oxygen sensor, as shown in FIG. 1, provides a linear output, with an increasing output signal the greater the exhaust oxygen concentration, including in regions of lean air/fuel ratios.

Lean-burn oxygen sensors have an internal electric heater to raise the temperature of the sensor element into its operating range. This is because lean burn engines run at cooler exhaust temperatures than stoichiometric engines. Lean-burn automotive engines typically run at about a 23 to 1 air/fuel ratio and an exhaust temperature of about 1000°–1100° F. Stoichiometric automotive engines typically run at about a 15 to 1 air/fuel ratio and an exhaust temperature of about 1200°–1300° F. Industrial, long interval lean-burn internal combustion engines run leaner and at lower exhaust temperatures than automobile engines. For example, typical ranges for lean-burn industrial engines are an air/fuel ratio of about 30 to 1 and an exhaust temperature of about 800°–900° F., though these ranges vary depending upon the engine and the type and quality of fuel used.

One known method for controlling the air/fuel ratio in industrial engines is to map each individual engine's performance with an emissions analyzer, for example "Predictive $NO_x$ Emissions Monitoring For Stationary Engines", G. Beshouri, *Diesel and Gas Turbine Worldwide*, May 1994, pp. 18–20. This is costly, and lengthens the time to market. It would be more desirable to use a lean-burn oxygen sensor, and control the air/fuel ratio according to the sensor's output. Lean-burn oxygen sensors developed to date have been directed toward automotive applications, and attempts to apply same in large industrial engines having leaner air/fuel ratios and lower exhaust temperatures have not been successful. Despite extensive searching, lean-burn oxygen sensors for industrial lean-burn engines have not been found in the marketplace. An automotive lean-burn oxygen sensor was used on an industrial lean-burn engine, however the sensor repeatedly failed prematurely. Replacement cost is high, including the downtime necessitated thereby. Unless the premature failures can be prevented, and the oxygen sensor made to last the full duration between service intervals, the use of a lean-burn oxygen sensor is not a feasible offering in industrial engine markets. The present invention addresses and solves this problem.

The invention also addresses another problem in exhaust sensing, namely that of sensor contamination and/or poisoning over time, which is particularly significant in long interval industrial engines. Engine exhaust carries many constituents which are detrimental to oxygen sensor life. These constituents can either poison the sensor, i.e. actually penetrate the sensor material and deactivate it, or mask the sensor, i.e. form a coating around the sensor and entomb it. In normal gaseous fueled engines, these constituents are typically due to additives that serve other useful purposes and are not readily eliminated. In addition to such substances, alternative fuel sources, e.g. natural gas, methane from landfills and sewage treatment facilities, etc., carry other contaminants. Furthermore these applications typically have such contaminants in higher concentrations than do normal applications. Further still, alterative fuel applications have even a greater need for air/fuel ratio control because the composition of the fuel can change significantly at the sites, otherwise fuel economy and exhaust emissions will not be optimized. The present invention addresses and solves this need.

DETAILED DESCRIPTION

Figure 1:
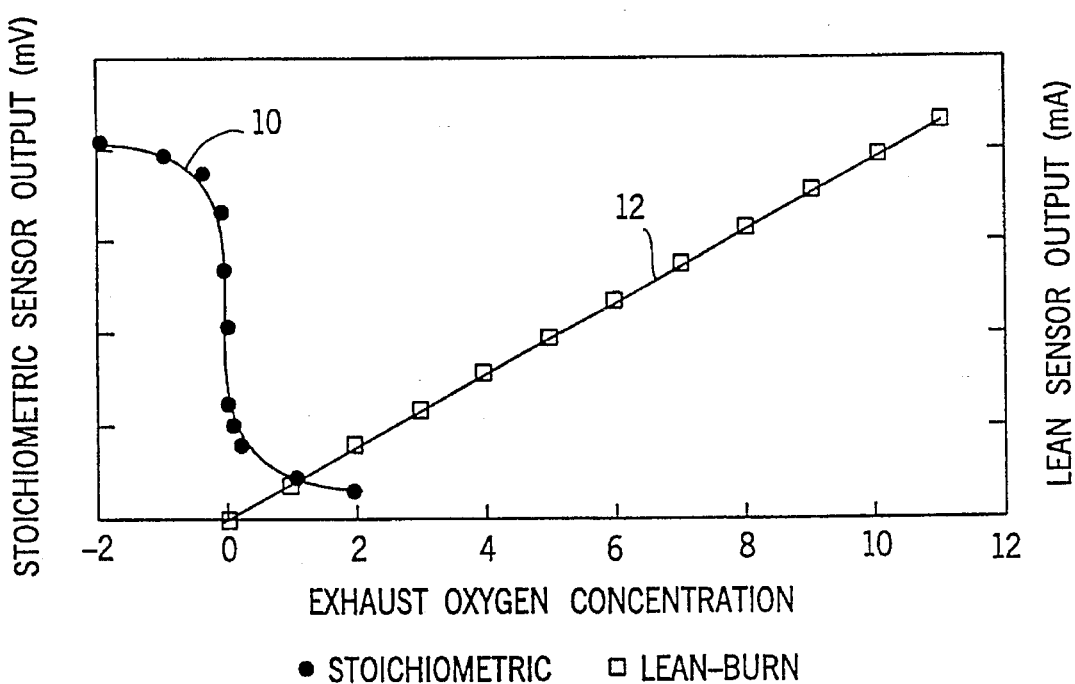
FIG. 1 is a graph showing stoichiometric sensor output and lean sensor output versus exhaust oxygen concentration.
Figure 2:
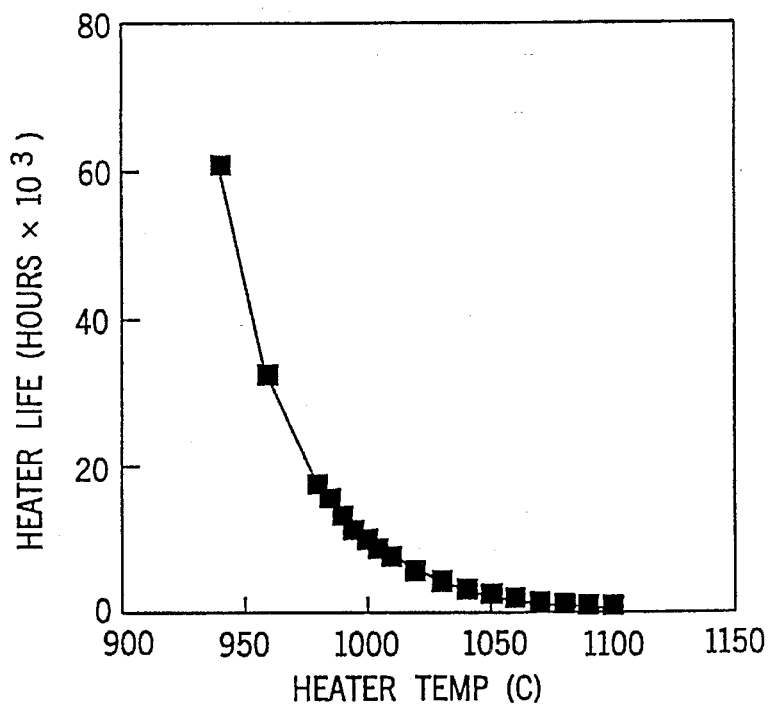
FIG. 2 is a graph showing heater life versus heater temperature.

FIG. 1 shows at trace 10 the output in millivolts of a stoichiometric oxygen sensor, characterized by a knee or drop-off from a high level to a low level at about zero exhaust oxygen concentration. Trace 12 shows the output in milliamps of a lean-burn oxygen sensor, which output is linear and increases with increasing oxygen concentration. The stoichiometric oxygen sensor having output characteristic 10 is used in automotive applications typically having about a 15 to 1 air/fuel ratio and an exhaust temperature of about 1200°–1300° F. The lean-burn oxygen sensor having output characteristic 12 is used in lean-burn automotive applications typically having about a 23 to 1 air/fuel ratio and an exhaust temperature of about 1000°–1100° F. The lean-burn oxygen sensor, a Nippondenso Part No. 5-192500-357, was attempted to be used in a lean-burn industrial engine application having a 30 to 1 air/fuel ratio and an exhaust temperature in the range of about 800°–900° F. It was found that in order to raise the temperature of the sensor element to its operating range affording an output characteristic like that shown at 12 at FIG. 1, the internal heater had to be overdriven, causing premature failure, as shown in FIG. 2.

Figure 3:
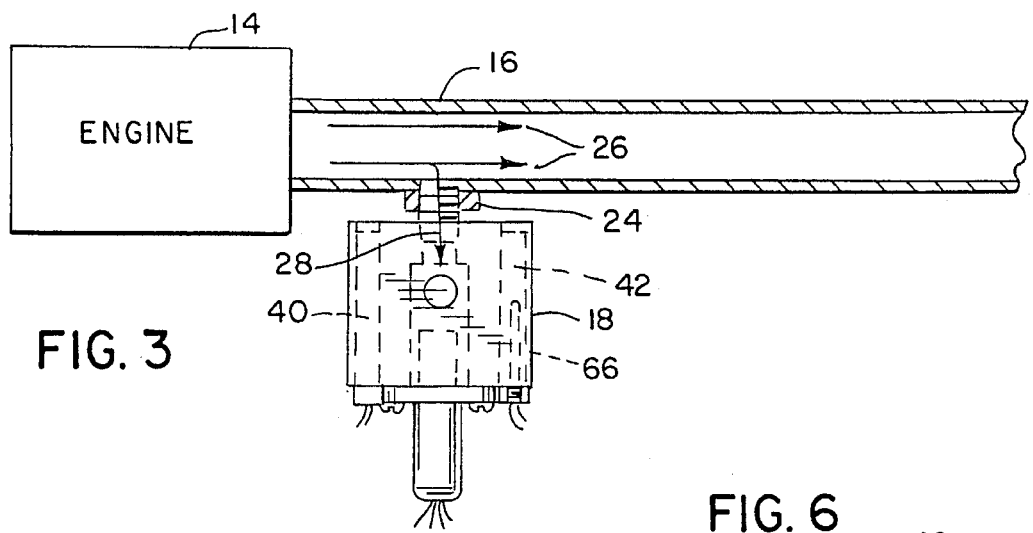
FIG. 3 schematically illustrates an exhaust sensing arrangement in accordance with the invention.
Figure 7:
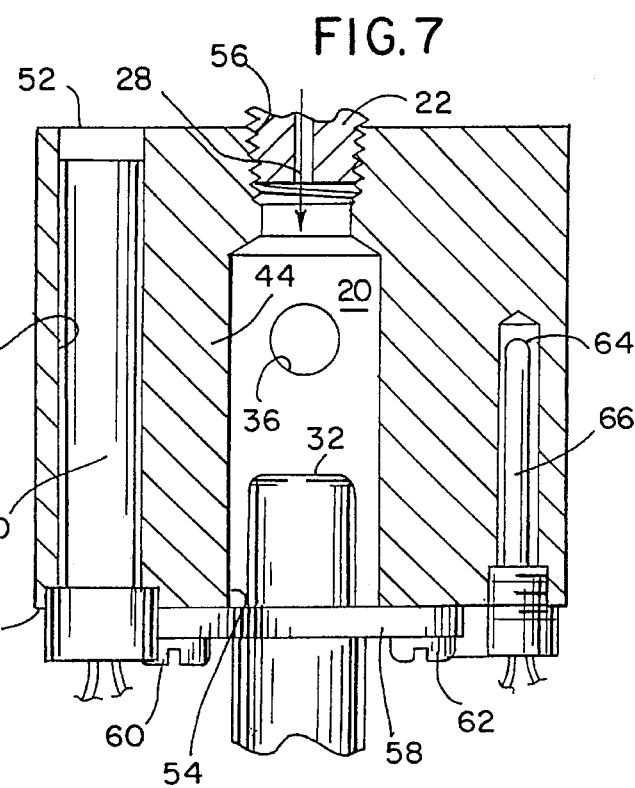
FIG. 7 is a sectional view taken along line 7—7 of FIG. 6.

FIG. 3 shows an exhaust gas sensing arrangement for an internal combustion engine 14 having an exhaust pipe 16. A housing 18 includes an antechamber 20, FIG. 7, mounted to exhaust pipe 16 by a nipple 22, FIG. 4, in threaded relation. The nipple is mounted to the exhaust pipe in any suitable manner, for example threaded to a bushing or nut 24 welded to the exhaust pipe around an opening therein. The exhaust flow path is shown at arrows 26. A diffusion path is shown at arrow 28, communicating with exhaust in exhaust pipe 16 and extending externally of the exhaust pipe through nipple 22 into antechamber 20.

Figure 4:
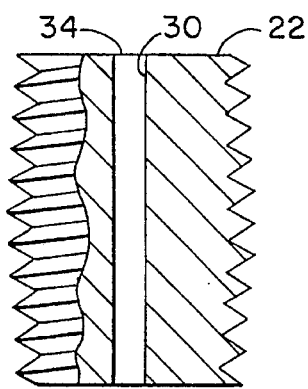
FIG. 4 is a side view, partially in section, of a portion of the structure of FIG. 3.
Figure 5:
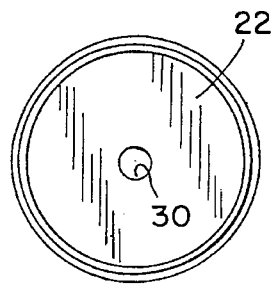
FIG. 5 is a top view of the structure of FIG. 4.
Figure 6:
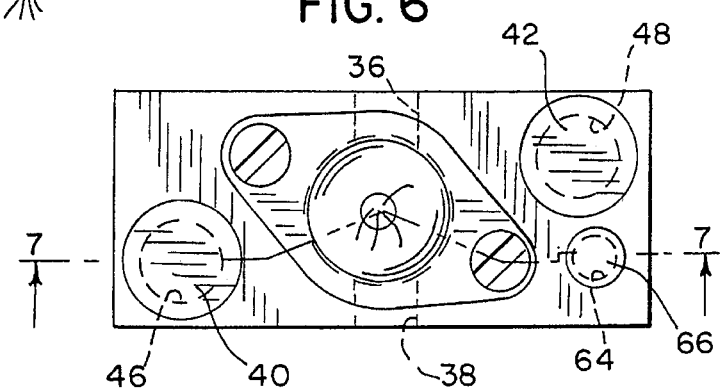
FIG. 6 is an end view of a portion of the structure of FIG. 3.

Nipple 22 has a restriction orifice 30, FIGS. 4 and 5, preferably of diameter 0.090–0.100 inch, which permits diffusion of gaseous exhaust into antechamber 20, and reduces diffusion of particulate exhaust into antechamber 20. This enhances the life of the sensor element 32, by reducing contamination and/or poisoning. This is because the constituents in the exhaust which are harmful to the sensor element are typically solid, particulate matter, not gaseous. The structure relies upon the natural tendency for gases, rather than particulate matter, to diffuse through a small opening, to reduce contamination of the sensor.

The sensor element 32 is provided by a lean-burn oxygen sensor, e.g. Nippondenso Part No. 5-192500-357, in the diffusion path sensing the gaseous exhaust. The diffusion path has a diffusion port 34 in the exhaust pipe. Exhaust gas diffuses through orifice 30 in nipple 22 along diffusion path 28 into antechamber 20 and is sensed by sensor element 32. Nipple 22 has a length extending laterally away from the direction of exhaust flow 26 in exhaust pipe 16; and orifice 30 extends along the entire length of nipple 22. Housing 18 has passages 36 and 38 extending externally from antechamber 20, which passages are plugged in most applications, but may be left open. The diffusion principle upon which the present invention is based does not require continuous flow through the antechamber.

Diffusion path 28 extends from exhaust pipe 16 to lean-burn oxygen sensor element 32 external of the exhaust pipe. The sensor element is heated, to be described, to an operating temperature range higher than the temperature of the exhaust. The noted restriction in the diffusion path also minimizes cooling of sensor element 32 by the cooler exhaust by reducing velocity and volume of exhaust gas flow against the sensor element. Restriction 30 is provided in diffusion path 28 upstream of sensor element 32 and is selected to provide sufficient diffusion of exhaust gas through the diffusion path for sensing by the sensor element but minimizing cooling of the sensor element by the lower temperature exhaust gas.

Lean-burn oxygen sensor element 32 is mounted to housing 18 and in communication with exhaust passing through the exhaust pipe. The sensor element has an internal electrical heater. One or more auxiliary heaters 40, 42 are mounted to housing 18 in heat transfer relation with sensor element 32 for heating the latter in addition to heating thereof by its internal heater. The housing has an internal sidewall 44 encircling and defining on the interior side thereof a cylindrical cavity providing antechamber 20, and defining on the other side thereof one or more cavities 46, 48 providing heater receptacles receiving respective auxiliary heaters 40, 42. Sidewall 44 separates antechamber cavity 20 and sensor element 32 from auxiliary heaters 40, 42 and isolates the auxiliary heaters from gaseous exhaust. Heat from auxiliary heaters 40, 42 is transferred to sensor element 32 through sidewall 44.

Housing 18 has distally opposite end faces 50 and 52. Antechamber 20 is formed by a cylindrical passage extending through the housing and having a first open end 54 at end face 50, and a second open end 56 at end face 52. End 56 engages nipple 22 in threaded relation. End 54 is closed by sensor element 32 having a flange 58 mounted to end face 50 by threaded bolts 60 and 62. Sensor element 32 extends partially into antechamber cylindrical passage 20 toward end 56. Heater receptacle cavities 46 and 48 are open end cavities formed by cylindrical passages extending through the housing between end faces 50 and 52 parallel to cylindrical passage antechamber 20 and on distally opposite sides thereof and separated therefrom by internal sidewall 44.

Auxiliary electrical heaters 40 and 42 are preferably each provided by a Watlow heater, Part No. L5EX45A, mounted in the respective receptacle cavity in thread mounted relation. The one or more auxiliary heaters 40, 42 heat sensor element 32, in addition to heating thereof by its internal heater, thereby eliminating the need to overdrive the sensor element's internal heater, thereby extending the life of the latter, FIG. 2. This desirably minimizes premature failure, which in turn affords extended service life, thus allowing extended continuous operation of the engine between service intervals, without downtime due to premature sensor failure. Furthermore, the auxiliary heaters are significantly less expensive than the sensor, and thus reduce replacement part cost, even enabling preventative replacement of the auxiliary heaters at scheduled service intervals, and further minimizing the chances of downtime. Housing 18 further includes a closed end cavity 64 extending into the housing from end face 50 and mounting in threaded relation a heat-sensing thermocouple 66 for feedback temperature sensing.

The invention enables the use of a lean-burn oxygen sensor in industrial long interval engine applications in a manner commercially feasible and acceptable to the market. The invention has other applications in various types of exhaust sensing, including oxygen, carbon monoxide, hydrocarbon, oxides of nitrogen, and other exhaust sensing applications.

It is recognized that various equivalents, alternatives and modifications are possible within the scope of the appended claims.

I claim:

1. An exhaust gas sensor for an internal combustion engine having exhaust means, comprising:

a nipple having first and second opposite distal ends and mounted to said exhaust means at said first distal end and communicating with exhaust passing through said exhaust means, said nipple having a restricted orifice extending therethrough from said first distal end to said second distal end which permits diffusion of gaseous exhaust through said orifice, and reduces diffusion of particulate exhaust through said orifice;

an antechamber mounted to said nipple at said second distal end and external to said exhaust means and communicating with said orifice such that gaseous exhaust diffuses through said orifice into said antechamber;

a sensor element mounted to said antechamber and sensing said gaseous exhaust therein.

2. The invention according to claim 1 wherein said nipple has a length extending laterally away from the direction of exhaust flow in said exhaust means, and said orifice extends along the entire length of said nipple between said first and second distal ends.

3. The invention according to claim 1 wherein said nipple is a separate member nonintegral with said exhaust means and thread mounted thereto.

4. An oxygen sensor for an internal combustion engine having an exhaust pipe, comprising:

a housing mounted to said exhaust pipe;

an oxygen sensor element mounted to said housing and in communication with exhaust passing through said exhaust pipe, said sensor element having an internal heater;

at least one auxiliary, heater mounted to said housing in heat transfer relation with said sensor element for heating the latter in addition to heating thereof by said internal heater.

5. The invention according to claim 4 wherein said housing comprises an antechamber mounted to said exhaust pipe by a nipple having a restriction orifice which permits diffusion of gaseous exhaust into said antechamber, and which reduces diffusion of particulate exhaust into said antechamber.

6. The invention according to claim 4 wherein said housing has an internal sidewall defining an antechamber on one side thereof and receiving said sensor element, and a heater receptacle on another side thereof and receiving said auxiliary heater, such that said internal sidewall separates said sensor element in said antechamber from said auxiliary heater in said heater receptacle, and wherein heat from said auxiliary heater is transferred to said sensor element through said internal sidewall.

7. The invention according to claim 6 wherein said housing has first and second distally opposite end faces, said antechamber comprises a cylindrical passage extending through said housing and having a first open end at said first end face and a second open end at said second end face, said first end being closed by said sensor element mounted to said first end face and extending partially into said cylindrical passage toward said second end.

8. The invention according to claim 7 wherein said heater receptacle comprises a cavity extending into said housing from said first end face generally parallel to said cylindrical passage and separated therefrom by said internal sidewall.

9. The invention according to claim 8 comprising a pair of open end cavities formed by passages extending through said housing between said first and second end faces and generally parallel to said antechamber cylindrical passage and on distally opposite sides thereof and separated therefrom by said internal sidewall.

10. The invention according to claim 9 wherein said housing further includes a closed end cavity mounting a temperature-sensing thermocouple.

11. The invention according to claim 5 wherein said nipple has first and second opposite distal ends and is mounted to said exhaust pipe at said first distal end and communicates with exhaust passing through said exhaust pipe, said restricted orifice extending through said nipple from said first distal end to said second distal end, said antechamber being mounted to said nipple at said second distal end.

\* \* \* \* \*